United States Patent
Lin et al.

(10) Patent No.: US 9,502,991 B2
(45) Date of Patent: Nov. 22, 2016

(54) HYBRID CONVERTER AND WIND POWER GENERATING SYSTEM

(71) Applicant: Huazhong University of Science and Technology, Wuhan (CN)

(72) Inventors: Weixing Lin, Wuhan (CN); Jinyu Wen, Wuhan (CN); Shaorong Wang, Wuhan (CN); Shijie Cheng, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 94 days.

(21) Appl. No.: 14/411,801

(22) PCT Filed: Feb. 25, 2014

(86) PCT No.: PCT/CN2014/072492
§ 371 (c)(1),
(2) Date: Dec. 29, 2014

(87) PCT Pub. No.: WO2014/187181
PCT Pub. Date: Nov. 27, 2014

(65) Prior Publication Data
US 2015/0145252 A1    May 28, 2015

(30) Foreign Application Priority Data
May 22, 2013 (CN) .......................... 2013 1 0191463

(51) Int. Cl.
H02M 7/145    (2006.01)
H02J 3/36    (2006.01)
(Continued)

(52) U.S. Cl.
CPC .............. *H02M 7/145* (2013.01); *F03D 9/005* (2013.01); *H02J 3/36* (2013.01); *H02M 7/19* (2013.01);
(Continued)

(58) Field of Classification Search
CPC ........ H02M 7/145; H02M 7/19; H02M 7/21; H02M 7/25; H02J 3/36; F03D 9/005
See application file for complete search history.

(56) References Cited

U.S. PATENT DOCUMENTS

| 5,644,482 A * | 7/1997 | Asplund | ................... | H02J 3/36 363/35 |
| 6,278,626 B1 * | 8/2001 | Teichmann | ......... | H02M 7/4826 363/135 |

(Continued)

FOREIGN PATENT DOCUMENTS

| CN | 1832318 A | 9/2006 |
| CN | 102522764 A | 6/2012 |

(Continued)

*Primary Examiner* — Jue Zhang
(74) *Attorney, Agent, or Firm* — Davis Wright Tremaine LLP (57) ABSTRACT

The present invention discloses a hybrid converter and a wind power generating system, the hybrid converter including a voltage source converter, a line commutated converter and a line commutated converter, a positive DC terminal of the voltage source converter is connected to a negative DC terminal of the line commutated converter, a positive DC terminal of the line commutated converter is connected to a positive DC transmission line, a negative DC terminal of the voltage source converter is connected to a positive DC terminal of the line commutated converter, and a negative DC terminal of the line commutated converter is connected to a negative DC transmission line. The present invention features a self-commutating capability, can be directly connected to a wind farm to convert wind power to DC power, and is able to improve rated voltage and rated power of the hybrid converter, technology of each component thereof is mature, and system reliability thereof is high.

12 Claims, 7 Drawing Sheets

(51) Int. Cl.
  *H02M 7/19* (2006.01)
  *H02M 7/25* (2006.01)
  *F03D 9/00* (2016.01)
  *H02M 7/21* (2006.01)
  *H02M 7/487* (2007.01)
  *H02M 1/00* (2006.01)
  *H02M 7/483* (2007.01)

(52) U.S. Cl.
  CPC ............. *H02M 7/21* (2013.01); *H02M 7/25* (2013.01); *H02M 7/487* (2013.01); *H02M 2001/0077* (2013.01); *H02M 2007/4835* (2013.01); *Y02E 10/76* (2013.01); *Y02E 60/60* (2013.01)

(56) References Cited

U.S. PATENT DOCUMENTS

| | | | |
|---|---|---|---|
| 2004/0246746 A1 | 12/2004 | Norrga et al. | |
| 2014/0146582 A1* | 5/2014 | Gupta | H02M 7/7575 363/35 |
| 2014/0268468 A1* | 9/2014 | Sheng | H01J 17/12 361/115 |
| 2014/0268926 A1* | 9/2014 | Gupta | H02M 5/44 363/35 |

FOREIGN PATENT DOCUMENTS

| | | |
|---|---|---|
| CN | 102738819 A | 10/2012 |
| CN | 102859861 A | 1/2013 |
| CN | 103337972 A | 10/2013 |
| WO | 0017996 A1 | 3/2000 |
| WO | 2012130296 A1 | 10/2012 |

* cited by examiner

HYBRID CONVERTER AND WIND POWER GENERATING SYSTEM

CROSS-REFERENCE TO RELATED APPLICATIONS

The present application is a U.S. National Stage entry under 35 U.S.C. §371 of International Application No. PCT/CN2014/072492, filed on Feb. 25, 2014, designating the United States of America and published in Chinese on Nov. 27, 2014, which in turn claims priority to Chinese Application No. 201310191463.6, filed on May 22, 2013, each of which is hereby incorporated by reference in its entirety.

FIELD OF THE INVENTION

The present invention relates to the power transmission and distribution filed, and more particularly to a hybrid converter and a wind power generating system.

BACKGROUND OF THE INVENTION

Since 2005, the installed wind power capacity has kept increasing rapidly, and annual increase of the installed wind power generating capacity is more than 20% during 2005-2011. Since 2011, development of wind power has entered into a stable period, and annual increased wind power generating capacity is approximately 40 GW. However, a bottleneck of rapid wind power development is that most wind power bases are located in remote areas where power load of local AC power grids is low, self-consumption thereof is poor, and wind energy is adversely distributed with respect to power demand, which make it necessary to transfer most wind power via large-scale wind power transmission for consumption at a load center. High voltage DC transmission (HVDC) is a commonly-used technology for the large-scale power transmission over long distance.

Prior to transmission by the HVDC, wind power needs to be firstly converted from AC power to DC power by a converter. In the field of the HVDC, devices for AC-DC conversion mainly comprise line commutated converters (LCC) based on thyristors, and voltage source converters (VSC) based on fully-controllable power semiconductors. Since in operation, the LCC requires an external AC voltage source to provide commutating voltage thereto, while a wind farm is a passive AC system, and it is difficult to establish AC voltage using multiple wind power generators that are individually distributed, therefore, the LCC is not suitable to directly convert the wind power to DC.

The voltage source converter can be applied to wind power transmission, and a number of HVDC systems have been used to transmit offshore wind power. However, there has been no report of applying the voltage source converter for transmission of inland wind power over long distance.

Applying the voltage source converter for transmission of inland wind power over long distance faces a main challenge that rated voltage and rated power of the voltage source converter cannot meet the requirement for long distance transmission of inland wind power. It is respected that by the year of 2015, typical voltage and power ratings of the voltage source converter will be ±320 kV and 1000 MW, respectively. At present, the voltage source converter mainly operates to transmit off-shore wind power with a transmission distance of approximately 100 km.

In long-distance power transmission over thousands of kilometers, if the rated DC voltage of a HVDC system is low, power that can be transmitted by each HVDC transmission line will be low; which makes it difficult to recover investment in constructing a transmission corridor by profit obtained from the HVDC system. Meanwhile, as DC voltage reduces, the DC current required to transmit the same amount of DC power will become higher, and power loss will be increased. Therefore, in long distance transmission over thousands of kilometers, a higher rated DC voltage will be required to improve transmission power and reduce the power loss during transmission. The LCC is used in long distance HVDC transmission over thousands of kilometers, and typically rated voltage thereof is ±800 kV. It can be seen that the rated voltage of the voltage source converter cannot meet requirement for large scale power transmission over long distance.

With the development of technology, the rated voltage of the voltage source converter in the future may be up to ±800 kV. Since the voltage source converter adopts the full-controllable power semiconductor with rated power of each semiconductor significantly lower than a single thyristor, to enable the rated voltage of the voltage source converter to meet the requirement for long distance transmission, a multiple full-controllable power semiconductors need to be connected in series (in direct serial connection or indirect serial connection) to increase the rated voltage of the voltage source converter. If the number of the full-controllable power semiconductors becomes large, complexity of the system will be increased, system reliability will be reduced, and the rated power of the voltage source converter still cannot meet the requirement for long distance transmission. To enable the rated power of the voltage source converter to meet the requirement for long distance transmission, a non-conventional scheme is to employ multiple lower rated voltage and high rated current full-controllable power semiconductors connected in series to increase the rated voltage and the rated power of the voltage source converter. If such scheme is used, the number of fully-controllable power semiconductors that are used will be significantly increased, which further increases system complexity and reduces system reliability.

SUMMARY OF THE INVENTION

In view of the above-mentioned problems, it is an objective of the invention to provide a hybrid converter that serially connects a first line commutated converter, a second line commutated converter and a voltage source converter for transmitting wind power, and is capable of addressing a problem with a conventional voltage source converter that rated voltage and a rated power thereof is inadequate, and that with a conventional line commutated converter that a self-commutating capability is absent so that both converters cannot be applied to a wind farm.

Provided is a hybrid converter, comprising a voltage source converter, a first line commutated converter and a second line commutated converter, a positive DC terminal of the voltage source converter is connected to a negative DC terminal of the first line commutated converter, a positive DC terminal of the first line commutated converter is connected to a positive DC transmission line, a negative DC terminal of the voltage source converter is connected to a positive DC terminal of the second line commutated converter, and a negative DC terminal of the second line commutated converter is connected to a negative DC transmission line, an AC terminal of the second voltage source converter, an AC terminal of the first line commutated converter and an AC terminal of the second line commutated converter are connected to a common AC bus.

In a class of this embodiment, the voltage source converter employs fully-controllable power semiconductor, and the first line commutated converter and the second line commutated converter employ thyristors.

In a class of this embodiment, the voltage source converter operates to control the AC voltage of the common AC bus, the AC voltage is applied to the first line commutated converter and the second line commutated converter to provide commutating voltage for the first line commutated converter and the second line commutated converter, so that the first line commutated converter and the second line commutated converter are able to operate normally without a conventional synchronous generator maintaining AC voltage of the common AC bus.

In a class of this embodiment, the first line commutated converter or the second line commutated converter comprises multiple six-pulse line commutated converter bridges In a class of this embodiment, the voltage source converter comprises a three-phase full bridge AC-DC converting circuit based on fully-controllable power semiconductors, or employs a two-level topology, a three-level topology, or a modular multilevel topology.

In a class of this embodiment, the hybrid converter further comprises a first bypass switch connected in parallel with the first line commutated converter, and a second bypass switch connected in parallel with the second line commutated converter; the first bypass switch operates to bypass the first line commutated converter during black-start and power reversal, and the second bypass switch operates to bypass the second line commutated converter during black-start and power reversal, whereby enabling the hybrid converter to have black-start and power reversal capabilities.

In a class of this embodiment, the first bypass switch and the second bypass switch are of the same structure, and the first bypass switch comprises a mechanical switch, and an anti-parallel thyristor pair serially connected with the mechanical switch.

In a class of this embodiment, the anti-parallel thyristor pair is formed by multiple thyristors connected in anti-parallel.

In a class of this embodiment, the first bypass switch or the second bypass switch is a DC circuit breaker.

Also provided is a wind power generating system, comprising a common AC bus, a first step-up transformer, a second step-up transformer, a third transformer, a fourth transformer, a hybrid converter, and an AC filter and a reactive power compensator respectively connected to the common AC bus; an input port of the first AC transformer is connected to a wind turbine generator set, an output port of the first step-up transformer is connected to an input port of the second step-up transformer via an AC transmission line, an output port of the second step-up transformer is connected to the common AC bus via the AC transmission line, the hybrid converter comprises a voltage source converter, a first line commutated converter and a second line commutated converter, a positive DC terminal of the voltage source converter is connected to a negative DC terminal of the first line commutated converter, a positive DC terminal of the first line commutated converter is connected to a positive DC transmission line via a first inductor, a negative DC terminal of the voltage source converter is connected to a positive DC terminal of the second line commutated converter, and a negative DC terminal of the second line commutated converter is connected to a negative DC transmission line via a second inductor, and an AC terminal of the second voltage source converter is connected to the common AC bus via the fourth transformer, an AC terminal of the first line commutated converter and an AC terminal of the second line commutated converter are respectively connected to the common AC bus via the third transformer.

In a class of this embodiment, the hybrid converter further comprises a first bypass switch connected in parallel with the first line commutated converter, and a second bypass switch connected in parallel with the second line commutated converter; the first bypass switch operates to bypass the first line commutated converter during black-start and power reversal, and the second bypass switch operates to bypass the second line commutated converter during black-start and power reversal.

In a class of this embodiment, the first bypass switch and the second bypass switch are of the same structure, and the first bypass switch comprises a mechanical switch, and an anti-parallel thyristor pair serially connected with the mechanical switch.

In a class of this embodiment, the anti-parallel thyristor pair is formed by multiple thyristors connected in anti-parallel.

In a class of this embodiment, the first line commutated converter and the second line commutated converter are of the same structure; the first line commutated converter comprises one or more six-pulse line commutated converter bridges connected in series, and the six-pulse line commutated converter bridge comprises a three-phase full bridge AC-DC converting circuit based on thyristors.

In a class of this embodiment, the first bypass switch and the second bypass switch are of the same structure, and the first bypass switch comprises a mechanical switch, and an anti-parallel thyristor pair serially connected with the mechanical switch.

The hybrid converter of the present invention features self-commutating capability, is able to directly convert wind power to DC power, and can be independently applied to a wind farm by serially connecting the first line commutated converter, the second line commutated converter and the voltage source converter for transmission of wind power; moreover, based on improvement to the prior art, the hybrid converter is able to increase the voltage rating and the power rating thereof, technology of each component is mature, and overall system reliability is high.

BRIEF DESCRIPTION OF ACCOMPANYING DRAWINGS

FIG. 4 illustrates different topologies of a voltage source converter of the hybrid converter of an exemplary embodiment of the invention; in which (a) is a two-level topology, (b) is a three-level topology; and (c) is a modular multilevel topology;

FIG. 8 illustrates simulation curves of the two-terminal HVDC system formed by the hybrid converter comprising bypass switches of another exemplary embodiment of the invention; in which (a) illustrates active power output by a wind farm, and DC power output by a rectifier, (b) is instantaneous DC voltage of a positive pole of the rectifier; (c) is instantaneous DC current of the positive pole of the rectifier; and (d) is the root-mean square value of AC voltage of the common AC bus of the rectifier.

SPECIFIC EMBODIMENTS OF THE INVENTION

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

The hybrid converter of an exemplary embodiment of the invention is mainly applied to the field of a wind power generating system that is accessed to a power system via HVDC, and capable of addressing problems that rated voltage and a rated power thereof are inadequate for large-scale power transmission over long distance as a conventional voltage source converter is used for transmission of inland wind power over long distance, and that a conventional line commutated converter cannot be directly employed for transmission of wind power in the absence of commutating voltage provided by an external AC voltage source.

Figure 1:
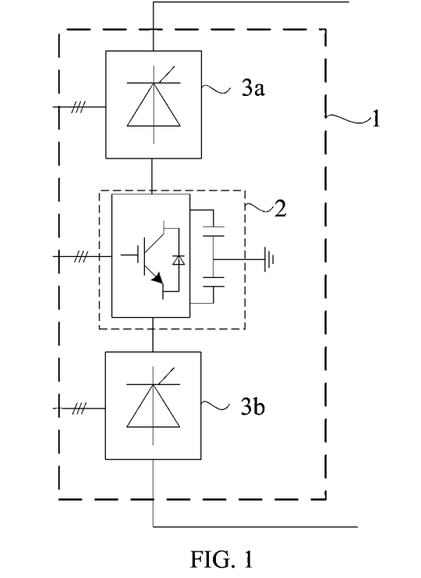
FIG. 1 is a schematic diagram of a hybrid converter of an exemplary embodiment of the invention.
Figure 2:
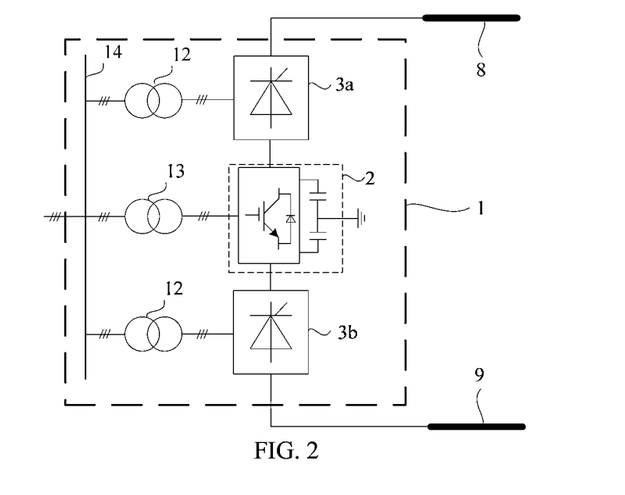
FIG. 2 illustrates a topology of the hybrid converter of an exemplary embodiment of the invention.

As shown in FIG. 1 and FIG. 2, a hybrid converter of the invention comprises a voltage source converter 2 and the line commutated converters 3 serially connected with voltage source converter 2, the voltage source converter 2 is based on full controllable power electronic semiconductors while the line commutated converter 3 are based on thyristors, line commutated converter 3 comprises a first line commutated converter 3a and a second line commutated converter 3b; the first line commutated converter 3a is connected at the positive DC transmission line; the second line commutated converter 3b is connected at the negative DC transmission line; an AC terminal of the voltage source converter 2, an AC terminals of the first line commutated converter 3a and the second line commutated converter 3b are respectively connected to the common AC bus 14 of the hybrid converter via intermediated circuits 12 and 13, a positive DC terminal of voltage source converter 2 is connected to the a negative DC terminal of the first line commutated converter 3a, a positive DC terminal of the first line commutated converter 3a is connected to the positive DC transmission line 8, negative terminal of the voltage source converter 2 is connected to the a positive DC terminal of the second line commutated converter 3b, a negative DC terminal of the second line commutated converter 3b is connected to the negative DC transmission line 9.

In this embodiment, in operation, the first line commutated converter 3a and the second line commutated converter 3b require external AC voltage voltage to provide commutation voltage therefor. As such, the first line commutated converter 3a and the second line commutated converter 3b in the hybrid converter 1 do not have self-commutating capability, while the voltage source converter 2 using full-controllable power semiconductors has self-commutating capability and is able to establish AC voltage at an AC side. To enable the hybrid converter 1 to have self-commutating capability as a whole, the voltage source converter 2 can be used to control AC voltage of the common AC bus 14, and the AC voltage is applied to the first line commutated converter 3a and the second line commutated converter 3b via an intermediated AC circuit 12, to ensure the first line commutated converter 3a and the second line commutated converter 3b operate properly. Based on the above arrangement on a control side, the hybrid converter 1 without an external AC voltage source enables the voltage source converter 2, the first line commutated converter 3a and the second line commutated converter 3b to operate normally via combination of the voltage source converter 2, the first line commutated converter 3a and the second line commutated converter 3b, and thus the hybrid convertor 1 can operate without the external AC voltage source, and features a self-commutating capability.

In this embodiment, to enable the hybrid converter 1 to be directly connected to a wind farm 60 whereby converting AC power from a wind turbine generator set to DC power. The voltage source converter 2 operates to control the AC voltage of the common AC bus 14, the AC voltage is applied to the first line commutated converter 3a and the second line commutated converter 3b via the intermediate AC circuit 12 to provide commutation voltage for the first line commutated converter 3a and the second line commutated converter 3b, so that the hybrid converter 1 can operate normally without the conventional synchronous generators maintaining the AC voltage of the common AC bus 14, and thus the hybrid converter 1 as a whole has a self-commutating capability. Each of the first line commutated converter 3a and the second line commutated converter 3b can employ a six-pulse line commutated converter bridge 23. Alternatively, to further increase the rated voltage of the first line commutated converter 3a and the second line commutated converter 3b, and thus increase the rated voltage of the hybrid converter 1, the line commutated converter can employ multiple six-pulse line commutated converter bridges connected in series.

In this embodiment, the first line commutated converter 3a and the second line commutated converter 3b are of the same structure, and the first line commutated converter 3a comprises a line commutated converter bridge. The first line commutated converter 3a and the second line commutated converter 3b may also comprises multiple line commutated converter bridges 23 sequentially connected in series. The line commutated converter bridge 23 is a mature three-phase AC-DC converting circuit based on thyristors, rated voltage of each converter bridge may be up to 200 kV, and rated power thereof may be up to 800 MW. By using multiple line commutated converter bridges connected in series, the rated voltage and the rated power thereof can be further increased.

The first line commutated converter 3a and the second line commutated converter 3b of this invention are mature and high-power AC-DC converters. Compared with the voltage source converter 2, the rated voltage and the rated power of each of the first line commutated converter 3a and the second line commutated converter 3b can be up to ±800 kV and 6400 MW respectively, and both of them are more technically mature, while a typical rated voltage and power of the voltage source converter 2 are only ±320 kV and 1000 MW respectively. A power loss ratio of each of the first line commutated converter 3a and the second line commutated converter 3b is approximately 0.35%, which is lower than that of voltage source converter 2 (at least 0.5%). Moreover, under the same rated power, cost of a voltage source converter 2 is 20% higher than that of each of the first line commutated converter 3a and the second line commutated converter 3b. However, the first line commutated converter 3a and the second line commutated converter 3b require a stable AC voltage source to provide commutation voltage therefor, while the wind farm is a passive AC network and it is difficult to establish stable AC voltage with individual wind turbine generator set, therefore, the line commutated converter cannot be used for directly converting wind power to DC power.

Figure 3:
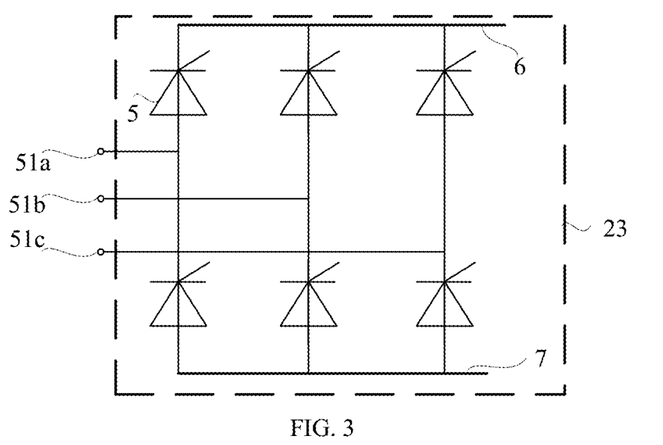
FIG. 3 illustrates a topology of a line commutated converter of the hybrid converter of an exemplary embodiment of the invention.

In this embodiment, the line commutated converter 3 is an AC-DC converting circuit, which is shown as a six-pulse line commutated converter bridge 23 in FIG. 3, and comprises six thyristors 5, a positive DC bus 6, and a negative DC bus 7. Every two thyristors 5 are serially connected to form a converter bridge arm, a positive DC terminal of each converter bridge arm is connected to the positive DC bus 6, a negative DC terminal of each converter bridge arm is connected to the negative DC bus 7, a middle point of each converter bridge arm is respectively connected to a phase-A AC terminal 51a, a phase-B AC terminal 51b and a phase-C AC terminal 51c. To improve the rated voltage of the converter bridge 23, each thyristor 5 can be formed by several thyristors 5 connected in series. Since an operating frequency of the line commutated converter bridge is typically 50 Hz or 60 Hz, simultaneous triggering of the thyristors can be ensured even if a multiple thyristors 5 are connected in series. The line commutated converter used in HVDC is normally formed by multiple line commutated converter bridges connected in series so that the rated voltage and rated power after serial connection are respectively ±800 kV and 6400 MW, and features a mature technology.

Figure 4A:
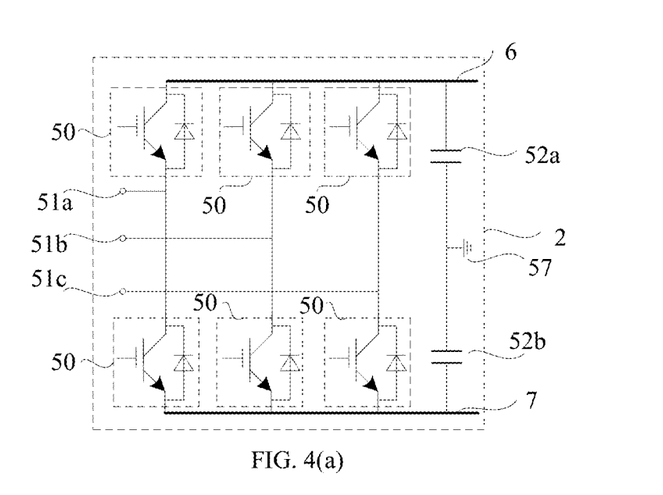

In this embodiment, the voltage source converter 2 is also an AC-DC converting circuit typically employing a topology such as a two-level topology, a diode clamped multi-level topology, a modular multilevel topology or so on. As shown in FIG. 4, the voltage source converter 2 can adopt a two-level topology shown in FIG. 4 (a), which comprises six fully-controllable power semiconductors 50, a positive DC bus 6, and a negative DC bus 7. Every two fully-controllable power semiconductors that are connected in series form a converter bridge arm, a positive terminal of each converter bridge arm is connected to the positive DC bus 6, a negative terminal of each converter bridge arm is connected to the negative DC bus 7, and a middle point of each converter bridge arm is respectively connected to a phase-A AC terminal 51a, a phase-B AC terminal 51b and a phase-C AC terminal 51c, a positive DC terminal of the positive DC capacitor is connected to the positive DC bus 6, a negative DC terminal of the positive DC capacitor is connected to the ground 57, a positive DC terminal of the negative DC capacitor is connected to the ground 57, a negative DC terminal of the negative DC capacitor is connected to the negative DC bus 7. To increase the rated voltage of voltage source converter 2, the fully-controllable power semiconductors 50, instead of multiple voltage source converters, are connected in series whereby forming a fully-controllable power semiconductor 50.

Figure 4B:
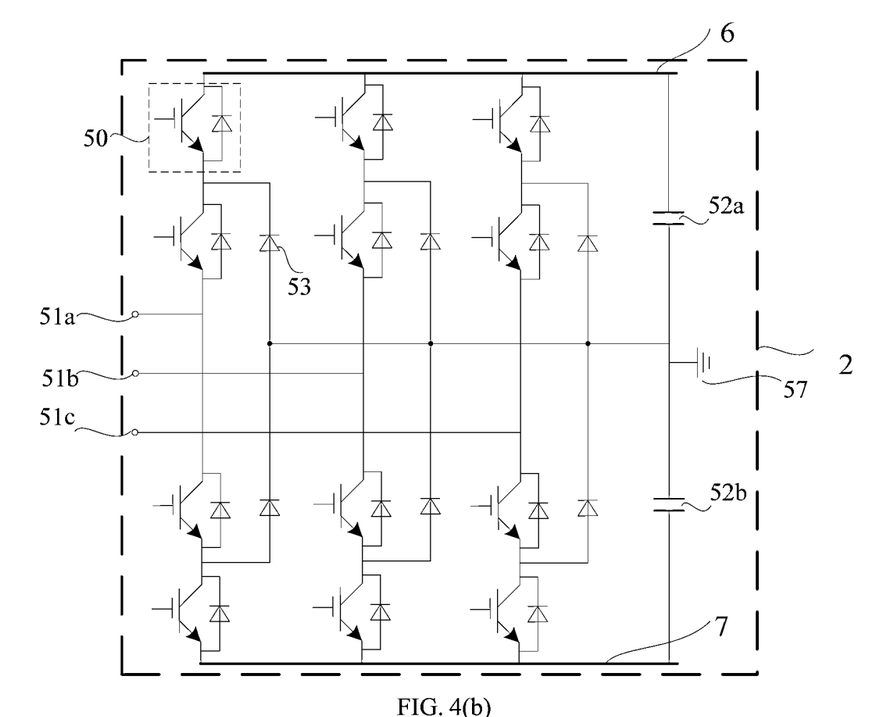

The voltage source converter 2 can also employ a three-level topology as shown in FIG. 4 (b), which mainly comprises twelve fully-controllable power semiconductors 50, six clamp diodes 53, a positive DC bus 6, and a negative DC bus 7. Every two fully-controllable power semiconductors 50 that are connected in series form a 'half-bridge arm', every two half-bridge arms that are connected in series form a converter bridge arm, a middle point of each half-bridge arm is connected to the ground 57 via a clamp diode 53, a positive DC terminal of each converter bridge arm is connected to the positive DC bus 6, a negative DC terminal of each converter bridge arm is connected to the negative DC bus 7, a middle point of each phase of the converter bridge arm is respectively connected to a phase-A AC terminal 51a, a phase-B AC terminal 51b and a phase-C AC terminal 51c, a positive DC terminal of the positive DC capacitor is connected to the positive DC bus 6, a negative DC terminal of the positive DC capacitor is connected to the ground 57, a positive DC terminal of the negative DC capacitor is connected to the ground 57, a negative DC terminal of the negative DC capacitor is connected to the negative DC bus 7. To increase the rated voltage of the voltage source converter 2, each fully-controllable power semiconductor 50 is formed by multiple fully-controllable power semiconductors 50, instead of multiple voltage source converters 2, connected in series, so as to increase the rated voltage of the voltage source converter 2.

Figure 4C:
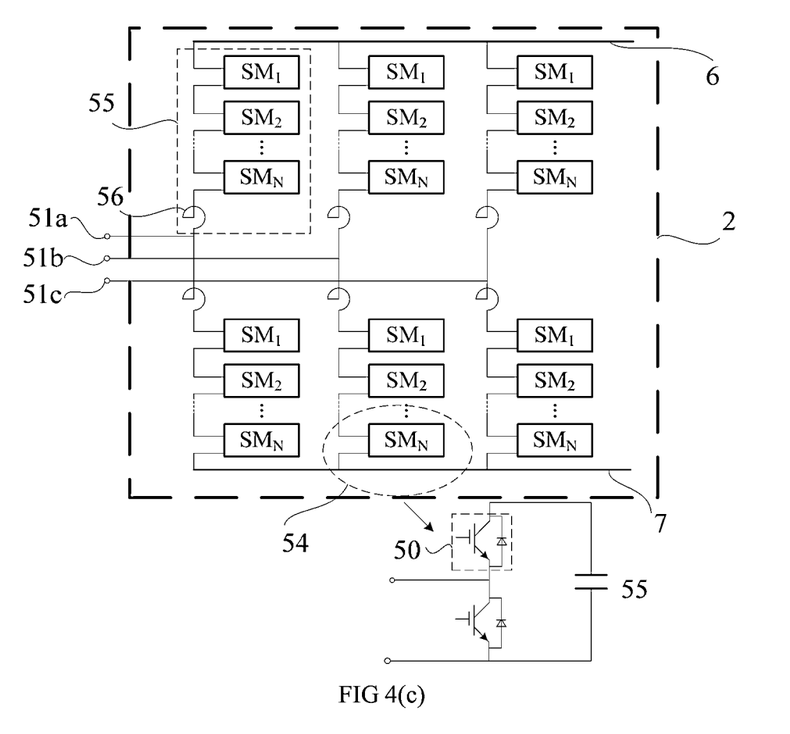

The voltage source converter 2 may also employ a modular multilevel topology shown in FIG. 4 (c), which mainly comprises six half-bridge arms 55. Every two half-bridge arms 55 that are connected in series form a converter bridge arm, a middle point of each converter bridge arm is respectively connected to the a phase-A AC terminal 51a, a phase-B AC terminal 51b, and a phase-C AC terminal 51c, a positive DC terminal and a negative DC terminal of each converter bridge arm are respectively connected to a positive DC bus 6 and a negative DC bus 7, each half-bridge arm comprises multiple sub-modules 54 that are connected in series and then to a smoothing reactor 56, and each sub-module mainly comprises two fully-controllable power semiconductors 50 and a DC capacitor 55.

In the above-mentioned topologies of voltage source converter 2, to increase the rated voltage for two-level and three-level topologies, multiple fully-controllable power semiconductors 50 need to be connected in series, since the two-level topology and the three-level topology require simultaneously triggering of the fully-controllable power semiconductors connected in series at a frequency of thousands of kHz in operation, but as the number of the fully-controllable power semiconductors connected in series is increased up to a certain number, it will be difficult to ensure simultaneously triggering of the multiple fully-controllable power semiconductors 50 connected in series, rated voltage of the two-level or three-level topologies obtained by increasing the number of serially-connected fully-controllable power semiconductors 50 can only be up to approximately ±300 kV, therefore, it is technically infeasible to further increase the rated voltage of two-level and three-level topologies beyond this limit. Meanwhile, the two-level and three-level topologies require a switching frequency to be as high as thousands of kHz, which makes it very difficult to ensure simultaneously triggering of the multiple serially-connected fully-controllable power semiconductors 50, and may cause low system reliability, and high power loss for the two-level and three-level topologies (approximately 1.6%).

The modular multilevel topology serially connect multiple fully-controllable power semiconductors, and thus increasing the rated voltage of the voltage source converter by increasing the number of the sub-modules 54 connected in series. Since the fully-controllable power semiconductors are connected in series via the sub-modules 50, the modular multilevel topology does not require fully-controllable power semiconductors 50 that are indirectly connected in series to be triggered simultaneously, therefore, compared with two-level and three-level topologies, the requirement of the modular multilevel topology for simultaneously triggering is much lower, system reliability is much higher, and in the meantime, it will be easier to increase the rated voltage of the modular multilevel converter. Since there is no need to simultaneously trigger all the serially-connected fully-controllable power semiconductors 50 at a frequency of thousands of kHz, power loss of the modular multilevel topology is much lower than the two-level and three-level topologies (typically approximately 0.5%). However, the modular multilevel topology has a bottleneck that with increase of the serially-connected sub-modules, voltage balancing between capacitors of the sub-module becomes difficult. It is anticipated that the rated voltage of modular multilevel topology may be up to ±320 kV. A modular multilevel topology with higher rated voltage is still under development, and technical uncertainties still exist. In addition, another drawback of the modular multilevel topology is that the number of fully-controllable power semiconductors 50 that are used is double of that of either the two-level or the three-level topologies, which leads to high system investment. Preferably, the voltage source converter 2 in the hybrid converter 1 uses the modular multilevel topology.

Compared with the first line commutated converter 3*a* and the second line commutated converter 3*b*, advantages of the voltage source converter 2 in this embodiment are: it features a self-commutating capability, a black-start capability, small occupation area, and no need to reverse the voltage polarity during power reversal, while its disadvantages are that power loss and investment are higher than the first line commutated converter 3*a* and the second line commutated converter 3*b*. The voltage source converter 2 usually employ a topology such as a two-level topology, a modular multilevel topology or so on, a typical power loss ratio of a two-level voltage source converter is approximately 1.6%, and that of a modular multilevel converter is approximately 0.5%.

Moreover, since rated voltage of a single fully-controllable power semiconductor is comparatively low, to increase the rated voltage of the voltage source converter 2, a multiple fully-controllable power semiconductors need to be connected in series, which increases system complexity and reduces system reliability. To simultaneously increase both the rated voltage and the rated current of the voltage source converter 2, more low-voltage and high-current fully-controllable power semiconductors need to be connected in series, which further increases system complexity and reduces system reliability.

Figure 5:
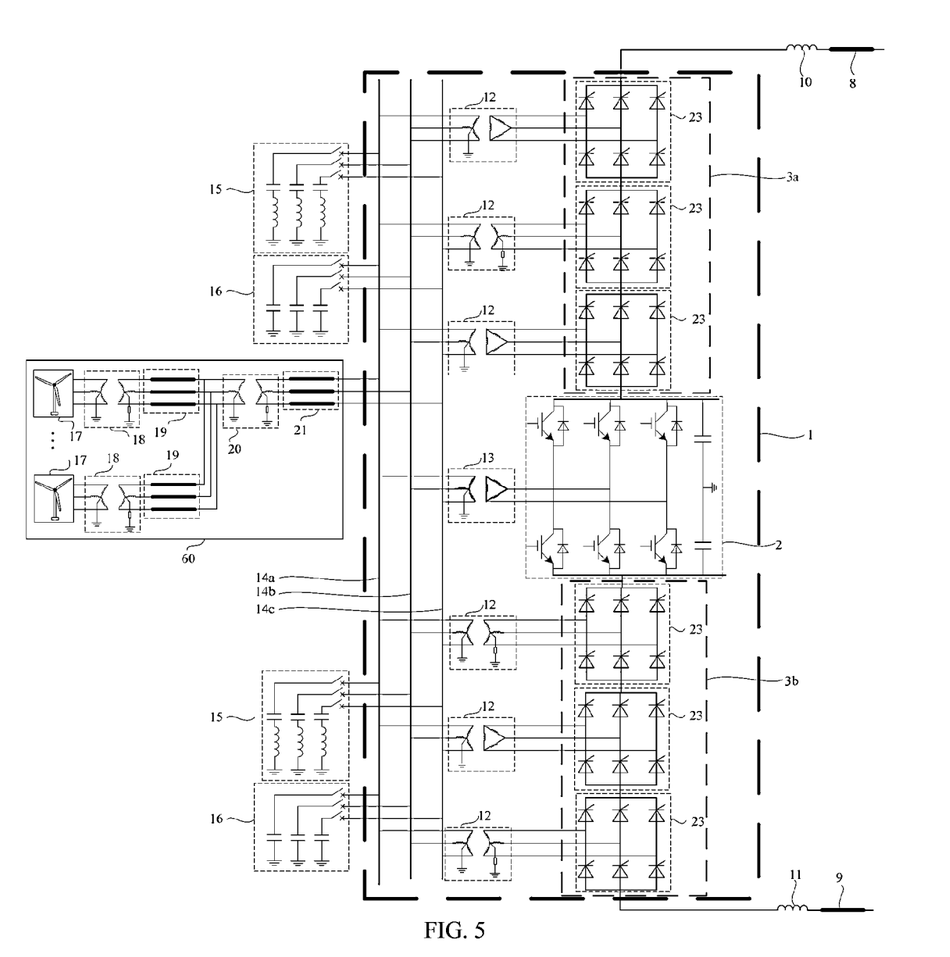
FIG. 5 is a schematic diagram of a wind power generating system of another exemplary embodiment of the invention.

The present invention also provides a wind power generating system, comprising a common AC bus 14, a first step-up transformer 18, a second step-up transformer 20, a third transformer 12, a fourth transformer 13, a hybrid converter 1, and an AC filter 15 and a reactive power compensator 16 respectively connected to the common AC bus 14; an input port of the first AC transformer 18 is connected to a wind turbine generator set 17, an output port of the first step-up transformer 18 is connected to an input port of the second step-up transformer 20 via an AC transmission line 19, an output port of the second step-up transformer 20 is connected to the common AC bus 14 via the AC transmission line 21, the hybrid converter 1 comprises a voltage source converter 2, a first line commutated converter 3*a* and a second line commutated converter 3*b*, a positive DC terminal of the voltage source converter 2 is connected to a negative DC terminal of the first line commutated converter 3*a*, a positive DC terminal of the first line commutated converter is connected to a positive DC transmission line 8 via a first inductor 10, a negative DC terminal of the voltage source converter 2 is connected to a positive DC terminal of the second line commutated converter 3*b*, and a negative DC terminal of the second line commutated converter 3*b* is connected to a negative DC transmission line 9 via a second inductor 11, an AC terminal of the second voltage source converter 2 is connected to the common AC bus 14 via the fourth transformer 13, and an AC terminal of the first line commutated converter 3*a* and an AC terminal of the second line commutated converter 3*b* are respectively connected to the common AC bus 14 via the third transformer 12.

FIG. 5 illustrates application of a hybrid converter 1 with a self-commutating capability to a wind power generating system, the first line commutated converter 3*a* and the second line commutated converter 3*b* respectively comprises three serially-connected six-pulse line commutated converter bridges 23 with rated voltage of 200 kV. Rated voltage of each six-pulse line commutated converter bridge is consistent with technology of an existing ±800 kV line commutated converters. Rated DC voltage of the voltage source converter 2 employing a two-level topology is ±200 kV, overall rated voltage of the hybrid converter is ±800 kV, AC terminals of the first line commutated converter 3*a*, the second line commutated converter 3*b* and the voltage source converter 2 are respectively connected to the common AC bus 14*a* to 14*c* via AC transformers 12 and 13, the wind turbine generator set 17 is connected to the common AC buses 14*a* to 14*c* via a first step-up transformer 18, a wind farm collection AC transmission line 19, a second step-up transformer 20 at the wind farm collecting point and an AC transmission line 21, so as to compensate reactive power consumed by the first line commutated converter 3*a* and the second line commutated converter 3*b* in operation and also to filter harmonic current generated by the first line commutated converter 3*a* and the second line commutated converter 3*b*. An AC filtering unit 15 and a reactive power compensator unit 16 are also installed on the common AC buses 14*a* to 14*c*, the AC filtering unit 15 and the reactive power compensator unit 16 can be divided into a number of groups so that the appropriate number of the AC filtering units 15 and the reactive power compensator units 16 can be selected according to transmitted active power by the hybrid converter 1. Since a wind farm 60 being a passive power grid instead of AC voltage source is connected to the hybrid converter 1 shown in FIG. 5 at an AC side thereof, application circumstance of FIG. 5 requires the hybrid converter 1 has a self-commutating capability, otherwise the hybrid converter 1 is not able to transmit wind power. To enable the hybrid converter 1 to have the self-commutating capability, the voltage source converter 2 can be used to control the AC terminal voltage of the hybrid converter 1, which is applied to the first line commutated converter 3*a* and the second line commutated converter 3*b* via the common AC bus 14, so that the first line commutated converter 3*a* and the second line commutated converter 3*b* can operate properly. By employing the above-mentioned arrangement at the control side, the hybrid converter 1 is able to enable the voltage source converter 2, the first line commutated converter 3*a* and the second line commutated converter 3*b* to operate properly without an external AC voltage source, and the hybrid converter 1 to have the self-commutating capability.

Figure 6:
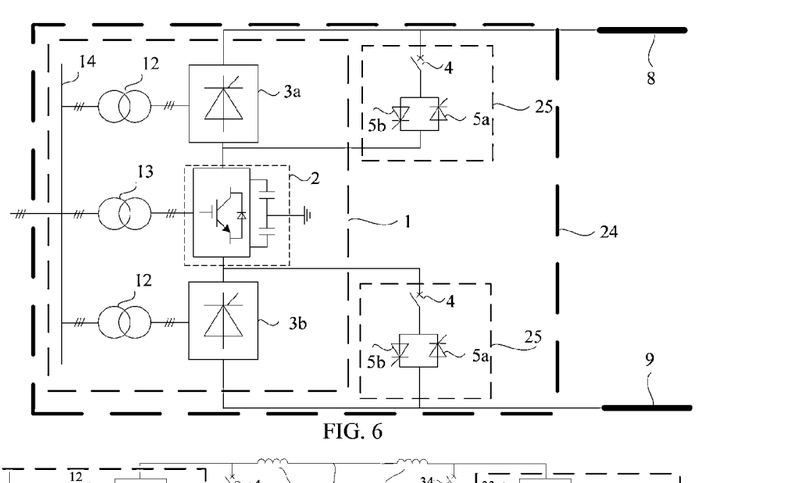
FIG. 6 illustrates a topology of a hybrid converter comprising bypass switches of another exemplary embodiment of the invention.

In this embodiment, to enable the hybrid converter 1 to have black-start and partial power reversal capabilities, FIG. 6 illustrates an improved hybrid converter 24. Compared with the hybrid converter 1, the improved hybrid converter 24 has a bypass switch 25 connected in parallel between a positive DC terminal and a negative DC terminal of each of the first line commutated converter 3a and the second line commutated converter 3b. The bypass switch 25 comprises a mechanical switch 4 and a pair of anti-parallel thyristors 5a and 5b connected in parallel. During black-start and power reversal, the bypass switch bypasses the line commutated converter so that only the voltage source converter with the black-start and the power reversal capabilities operates.

Adding the bypass switch 25 has a benefit of enabling the hybrid converter 1 to have the black-start and the power reversal capabilities. Otherwise, if the hybrid converter 1 does not have the black-start capability and the hybrid converter 1 is solely connected to the wind farm 60, the wind farm 60 is not able to switch from a stalling mode to an operating mode. In the case that the hybrid converter 1 is connected to a local power load in addition to the wind farm 60, if the hybrid converter 1 does not have the power reversal capability and output wind power is lower than the local power load, insufficient power supply may occur at the local power load.

The bypass switch 25 can be formed by the mechanical switch 4 and the anti-parallel thyristors 5a and 5b connected in series. Alternatively, the bypass switch may employ a DC circuit breaker. The anti-parallel thyristor may comprise a pair of anti-parallel thyristors. To increase withstanding voltage of the bypass switch, the bypass switch may comprise multiple pairs of anti-parallel thyristors connected in series.

After the bypass switch 25 is added, a principle of black-start is described as follows: taking a two-terminal HVDC system shown in FIG. 7 as an example, by closing the mechanical switches 4 and 34, and applying trigger pulses to the anti-parallel thyristors 5a, 5b, 35a and 35b, the line commutated converter 3 at a rectifier side and the line commutated converter 31 at an inverter side are bypassed, and only the voltage source converters 2 and 32 are put into operation at the rectifier side of the hybrid converter 1 and the inverter side of the hybrid converter 32, so that the HVDC system can be black-started according to starting of a two-terminal HVDC system based on voltage source converters.

With the bypass switch 25 added, a principle of the power reversal is described as follows: before power reversal, the line commutated converters 3 and 33 and the voltage source converters 2 and 32 are all in operation, the mechanical switches 4 and 34 are off, and the anti-parallel thyristors 5a, 5b, 35a and 35b are blocked. When the HVDC system receives a power reversal command, a trigger angle of line commutated converter 3 at the rectifier side is shifted between 120°-150° to enable the line commutated converter 3 to operate in the inverter mode. Since both line commutated converters 3 and 33 are in the inverter mode, DC voltage of the DC transmission lines 8 and 9 is decreased rapidly. Upon detecting the remaining voltage at a positive DC terminal and a negative DC terminal of each of the line commutated s 3 and 33 are lower than the withstanding voltage of the anti-parallel thyristors 5a, 5b, 35a and 35b, the mechanical switches 4 and 34 will be closed, trigger pulses will be applied to the anti-parallel thyristors 5a, 5b, 35a and 35b so as to bypass the line commutated converter 3 and 33 whereby putting the voltage source converter 2 and 32 into operation, so that the HVDC system facilitates partial power reversal capability according to operation of a two-terminal HVDC system based on voltage source converters.

To enable the hybrid converter 1 to have the black-start and the power reversal capabilities, a bypass switch 25 may be connected in parallel between the positive DC terminal and the negative DC terminal of each of the first line commutated converter 3a and the second line commutated converter 3b. During black-start and power reversal, the bypass switch 25 operates to bypass the first line commutated converter 3a and the second line commutated converter 3b, so that the hybrid converter 1 only uses the voltage source converter 2, so as to enable the hybrid converter 1 to have the black-start and the power reversal capabilities. Preferably, the bypass switch 25 is formed by the mechanical switch 4 and the anti-parallel thyristors 5a and 5b connected in series, and the anti-parallel thyristors 5a and 5b can be formed by multiple pairs of anti-parallel thyristors connected in series, so as to increase the withstanding voltage of the bypass switch.

Novelty and non-obviousness of the present invention over the prior art are:

(1) the invention provides a scheme in which the first line commutated converter 3a, the second line commutated converter 3b and the voltage source converter 2 are connected in series for wind power transmission, by increasing the number of line commutated converter bridges 23 connected in series, the rated DC voltage of the first line commutated converter 3a and the second line commutated converter 3b, and further the rated voltage of the hybrid converter 1 are increased; the voltage source converter 2 operates to establish the AC voltage of the common AC bus 14, and the AC voltage is applied to the first line commutated converter 3a and the second line commutated converter 3b via the intermediated circuit 12 so as to provide commutation voltage for the first line commutated converter 3a and the second line commutated converter 3b, and thus the hybrid converter 1 has the self-commutating capability and can be directly connected to the wind farm 60 whereby converting AC power generated thereby to DC power; such a scheme combines an advantage of each of the first line commutated converter 3a and the second line commutated converter 3b that is high voltage and large power with that of the voltage source converter 2 that features the self-commutating capability and can be directly used by the wind farm, and overcomes problems with the voltage source converter 2 that the rated voltage and the rated power thereof are low, and with the first line commutated converter 3a and the second line commutated converter 3b that they cannot be directly used for wind power transmission as an external AC voltage source is required to provide commutation voltage thereto.

(2) the hybrid converter 1 comprises the first line commutated converter 3a, the second line commutated converter 3b and the voltage source converter 2 connected in series, and the voltage source converter 2 provides commutating voltage for the first line commutated converter 3a and the second line commutated converter 3b, so that the hybrid converter 1 has a self-commutating capability, and can be applied to a passive AC power grid (such as a wind farm or a resistive AC network) without a conventional synchronous generator (3) the hybrid converter comprises the first line commutated converter 3a, the second line commuted converter 3b and the voltage source converter 2 connected in series, and the bypass switch 25 is connected in parallel between the positive DC terminal and the negative DC terminal of each of the first line commutated converter 3a and the second line commutated converter 3b so as to enable the hybrid converter to have black-start and power reversal capabilities.

Figure 7:
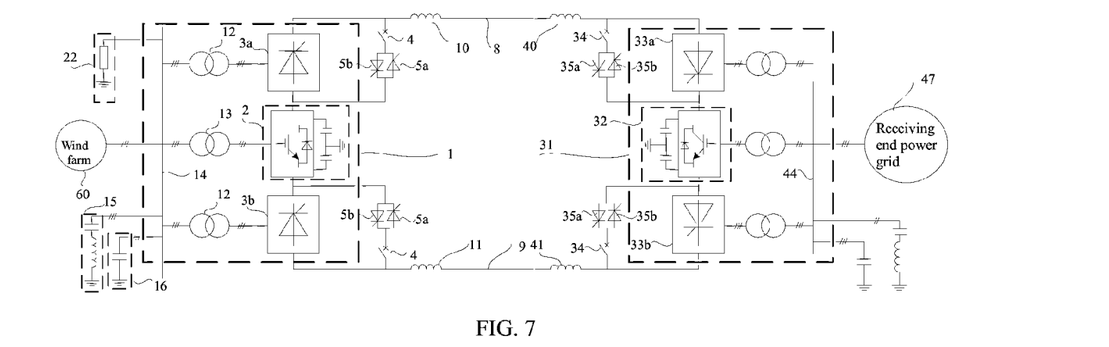
FIG. 7 illustrates a topology of a two-terminal HVDC system formed by a hybrid converter comprising bypass switches of another exemplary embodiment of the invention.

To verify technical feasibility of the present invention, a simulation example corresponding to the system shown in FIG. 7 is built using HVDC simulation software PSCAD/

EMTDC. FIG. 7 illustrates a two-terminal HVDC system with rated DC voltage of ±800 kV and DC rated power of 4000 MW. The system mainly comprises the hybrid converter 1 at a rectifier side thereof and the hybrid converter 31 at an inverter side thereof. The common AC bus 14 of the hybrid converter 1 is connected to the wind farm 60 and a local power load 22, the common AC bus of the hybrid converter 31 is connected to a receiving end power grid 47. To enable the system to have black-start and power reversal capabilities, bypass switches 4, 5a, 5b and 34, 35a and 35b are respectively connected in parallel between positive DC terminals and negative DC terminals of each of the line commutated converter 3 and line commutated converter 33. The voltage source converters 2 and 32 have rated DC voltage of ±200 kV and rated power of 1000 MW, each of the line commutated converters 3 and 33 respectively comprises three six-pulse line commutated converters 23 connected in series, and rated DC voltage of each six-pulse line commutated converter bridge 23 is 200 kV.

In the simulation example, each converter is built using a specific switching model provided in the standard libraries of the PSCAD/EMTDC. To improve simulation speed, a wind turbine generator set with the same capacity as multiple wind farms is used for modeling, and a frequency converter employs the specific switching model. Since all primary device models used in the simulation example are built using the specific switching models provided in the standard library of PSCAD/EMTDC, results obtained by the simulation are to be highly trustable.

Corresponding simulation results are presented in FIG. 8. FIG. 8 (*a*) illustrates active power output by the wind farm, and DC power output by hybrid converter 1, FIG. 8 (*b*) illustrates instantaneous DC voltage of a positive pole of the hybrid converter 1, FIG. 8 (*c*) illustrates instantaneous DC current of the positive pole of the hybrid converter 1, and FIG. 8 (*d*) illustrates an effective value of AC voltage of the common AC bus of the hybrid converter 1.

Figure 8A:
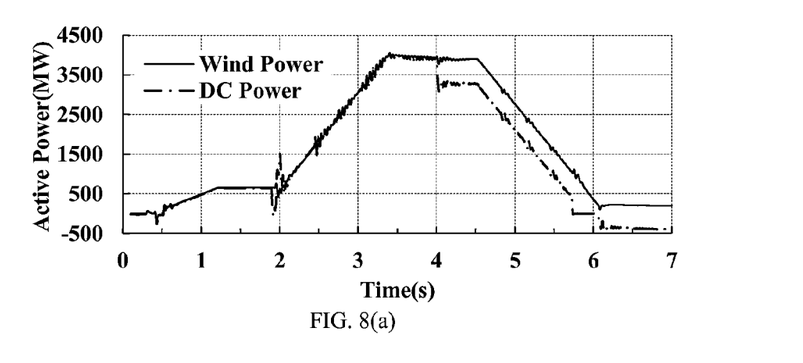

From 0 s to 1.2 s, bypass switches 4, 5a, 5b, 34, 35a and 35b on both sides of each of the hybrid converters 1 and 31 are in operation, the line commutated converters 3 and 33 are therefore shorted, only the voltage source converters 2 and 32 are put into operation in the system, and the system is black-started in an operation mode similar to a traditional two-terminal HVDC based on voltage source converters. Before 1.8 s, since wind power is low, the bypass switches are in operation. As shown in FIG. 8 (*a*), during this period, DC voltage at the rectifier side is approximately 220 kV, which is higher than that at the inverter side. The DC voltage of the system contains no pulsation of the line commutated converter only as the voltage source converter is put into operation. After 1.8 s, with the increase of wind power, the bypass switches are to be switched off, single pole DC voltage at the rectifier side is increased up to approximately +800 kV, and represents DC voltage pulsation characteristics of a typical LCC converter, meanwhile, the DC current reduces at 1.8 s. Between 1.8 s and 3.4 s, the wind power is increased up to 3900 MW, and DC power transmitted by the HVDC system is also increased up to 3900 MW.

At 4.0 s, the local power load with power of 600 MW is put into operation, the DC power transmitted by the system is reduced to approximately 3300 MW, as shown in FIG. 8 (*a*). Between 4.5 s and 6.05 s, the wind power is reduced from 3900 MW to approximately 200 MW, and the DC power and the DC current transmitted by the HVDC system are also reduced. At 5.7 s, system detects that the DC current is lower than 10% of the rated DC current, the bypass switches are put into operation again, and only the voltage source converter 2 and 32 at both the rectifier side and the inverter side are put into operation. After 6.05 s, since the wind power is lower than the local power load at the rectifier side, the HVDC system reversely transmit 400 MW power to the local load, and the HVDC system operates in a power reversal mode.

FIG. 8 (*d*) illustrates that the AC voltage of the wind farm is maintained in the vicinity of the rated voltage thereof, and therefore the hybrid converter 1 is able to operate properly without a conventional synchronous generator maintaining AC voltage thereof.

Figure 8B:
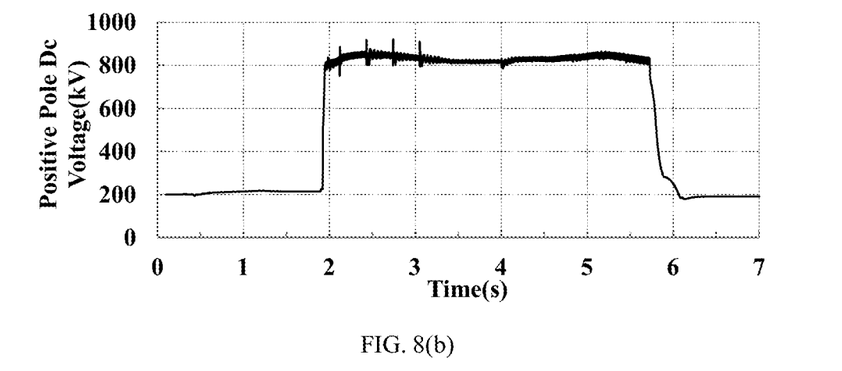
Figure 8C:
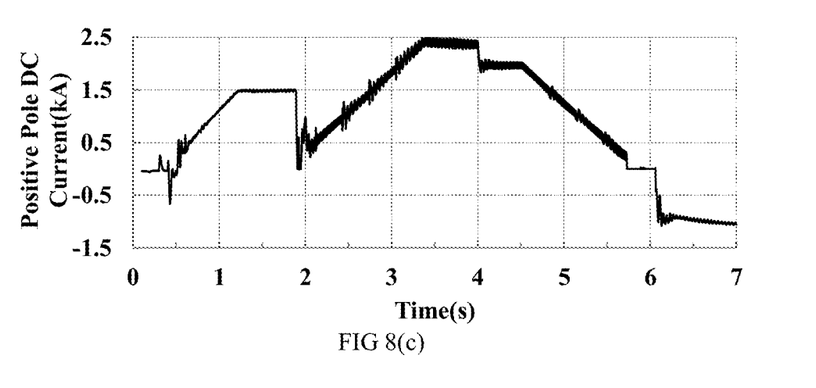
Figure 8D:
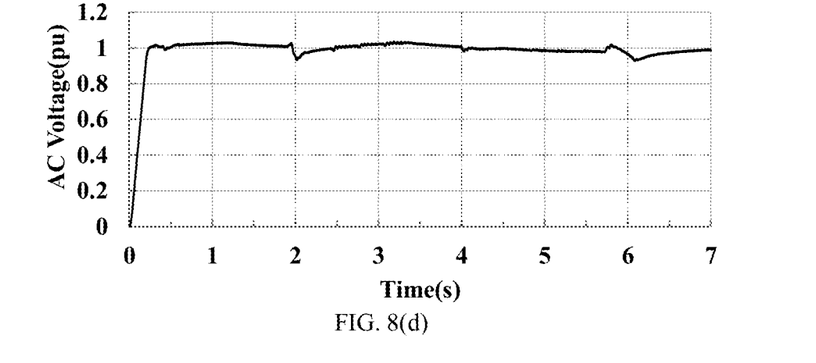

The above simulation results show that the hybrid converter is technically feasible for direct transmission of wind power. With no line commutated converter but only the voltage source converter in operation, DC voltage of the system is approximately ±200 kV (FIG. 8 (*a*)), and active power thereof is approximately 600 MW (FIG. 8 (*b*)). As the line commutated converter is put into operation, the DC voltage of the system is increased up to ±800 kV (FIG. 8 (*a*)), the active power thereof is increased up to 3900 MW (FIG. 8 (*b*)). The above simulation results prove that the present invention is able to solve a problem with the conventional voltage source converter that it cannot meet requirement for large-scale transmission of wind power over long distance (thousands of kilometers) due to its low rated DC voltage and rated DC power.

The present invention provides a technically feasible scheme for large-scale transmission of wind power over long distance via the HVDC system, while other schemes or technologies in the art are either technically unfeasible, or feature technically uncertainty and high cost.

(1) Compared with a single first line commutated converter 3a and second line commutated converter 3b, since the first line commutated converter 3a and the second line commutated converter 3b do not have self-commutating capability, the line commutated converter cannot be independently applied to the wind farm, and application of a single first line commutated converter 3a and second line commutated converter 3b to wind power transmission is technically unfeasible, while the hybrid converter 1 of the present invention has self-commutating capability, and can be directly connected to the wind farm for converting the wind power to DC power, therefore, it is technically feasible to use the invention for wind power transmission;

(2) Compare with the voltage source converter 2, it is anticipated that in year 2015, the rated voltage of the voltage source converter 2 is approximately ±320 kV, but the voltage source converter 2 with higher rated voltage is technically immature, namely there is technical uncertainty during development of the voltage source converter 2 with even higher rated voltage; in comparison, the rated voltage of the present invention can be increased up to ±800 kV, and each component thereof is mature, which enable the hybrid converter to meet requirement for the rated voltage for large-scale transmission of wind power over long distance via the HVDC system;

(3) Although direct or indirect serial connection of multiple fully-controllable power semiconductors is able to increase the rated voltage of the voltage source converter 2, however, system complexity is to be increased and system reliability is to be reduced. Meanwhile, even the rated voltage is increased, the rated power is still inadequate for large-scale transmission over long distance, at this time, although serial connection of more lower-voltage high-current fully-controllable power semiconductors is able to increase both the rated voltage and the rated power of the voltage source converter 2, system complexity is to be further increased, and system reliability is to be further decreased. By combining and improving conventional mature technologies, the present invention is able to increase both the rated voltage and rated power of the hybrid converter 1, each component forming the hybrid converter 1 is mature, and system reliability of the system is high.

(4) A minimum power loss ratio of the voltage source converter 2 is approximately 0.5%, if a ratio between power of the voltage source converter 2 and overall power of the first line commutated converter 3a and the second line commutated converter 3b is selected as 1:3, a power loss ratio of the present invention is 0.35%*0.75+ 0.5%*0.25=0.39%, which is lower than that of the voltage source converter 2. Taking a transmission line with power of 6400 MW and annual usage hours of 2000 as an example, as compared a HVDC system based on voltage source converters 2, it is estimated that a HVDC system employing the present invention with the same rated power (assume such a technology exists in the future) is able to save approximately 28 million RMB on the power loss.

(5) Still taking the 6400 MW HVDC system as an example, the HVDC system employing the present invention (assume such a technology exists in the future) is able to save approximately 3 billion RMB investment compared with a HVDC system employing the voltage source converter 2 with the same rated power.

While preferred embodiments of the invention have been described above, the invention is not limited to disclosure in these embodiments and the accompanying drawings. Any changes or modifications without departing from the spirit of the invention fall within the scope of the invention.

The invention claimed is:

1. A hybrid converter, comprising a voltage source converter (2), a first line commutated converter (3a), and a second line commutated converter (3b), wherein:
   a positive DC terminal of said voltage source converter (2) is connected to a negative DC terminal of said first line commutated converter (3a), a positive DC terminal of said first line commutated converter is connected to a positive DC transmission line (8), a negative DC terminal of said voltage source converter (2) is connected to a positive DC terminal of said second line commutated converter (3b), and a negative DC terminal of said second line commutated converter (3b) is connected to a negative DC transmission line (9); and
   an AC terminal of said voltage source converter (2), an AC terminal of said first line commutated converter (3a), and an AC terminal of said second line commutated converter (3b) are connected to a common AC bus (14).

2. The hybrid converter of claim 1, wherein said voltage source converter (2) operates to control an AC voltage of said common AC bus (14), said AC voltage is applied to said first line commutated converter (3a) and said second line commutated converter (3b) to provide commutating voltage for said first line commutated converter (3a) and said second line commutated converter (3b), so that said hybrid converter is able to operate normally without a conventional synchronous generator maintaining AC voltage of said common AC bus (14).

3. The hybrid converter of claim 1, wherein said first line commutated converter (3a) or said second line commutated converter (3b) comprises one or more six-pulse line commutated converter bridges connected in series, and said six-pulse line commutated converter bridge comprises a three-phase full bridge AC-DC converting circuit based on thyristors.

4. The hybrid converter of claim 1, wherein said voltage source converter (2) comprises a three-phase full-bridge AC-DC converting circuit based on fully-controllable power semiconductors.

5. The hybrid converter of claim 1, wherein said hybrid converter further comprises a first bypass switch connected in parallel with said first line commutated converter, and a second bypass switch connected in parallel with said second line commutated converter; wherein said first bypass switch operates to bypass said first line commutated converter during black-start and power reversal, and said second bypass switch operates to bypass said second line commutated converter during black-start and power reversal, thereby enabling said hybrid converter to have black-start and power reversal capabilities.

6. The hybrid converter of claim 5, wherein said first bypass switch and said second bypass switch are of the same structure, and said first bypass switch comprises a mechanical switch (4), and an anti-parallel thyristor pair (5a, 5b) serially connected with said mechanical switch.

7. The hybrid converter of claim 6, wherein said anti-parallel thyristor pair is formed by multiple thyristors connected in anti-parallel.

8. A wind power generating system, comprising a common AC bus (14), a first step-up transformer (18), a second step-up transformer (20), a third transformer (12), a fourth transformer (13), a hybrid converter (1), and an AC filter (15), and a reactive power compensator (16) respectively connected to said common AC bus (14); wherein an input port of said first AC transformer (18) is connected to a wind turbine generator set (17), an output port of said first step-up transformer (18) is connected to an input port of said second step-up transformer (20) via an AC transmission line (19), and an output port of said second step-up transformer (20) is connected to said common AC bus (14) via said AC transmission line (21); wherein
   said hybrid converter (1) comprises a voltage source converter (2), a first line commutated converter (3a), and a second line commutated converter (3b);
   a positive DC terminal of said voltage source converter (2) is connected to a negative DC terminal of said first line commutated converter (3a), a positive DC terminal of said first line commutated converter is connected to a positive DC transmission line (8) via a first inductor (10), a negative DC terminal of said voltage source converter (2) is connected to a positive DC terminal of said second line commutated converter (3b), and a negative DC terminal of said second line commutated converter (3b) is connected to a negative DC transmission line (9) via a second inductor (11); and
   an AC terminal of said second voltage source converter (2) is connected to said common AC bus (14) via said fourth transformer (13), and an AC terminal of said first line commutated converter (3a) and an AC terminal of said second line commutated converter (3b) are respectively connected to said common AC bus (14) via said third transformer (12).

9. The wind power generating system of claim 8, wherein said hybrid converter further comprises a first bypass switch connected in parallel with said first line commutated converter, and a second bypass switch connected in parallel with said second line commutated converter; wherein said first bypass switch operates to bypass said first line commutated converter during black-start and power reversal, and said second bypass switch operates to bypass said second line commutated converter during black-start and power reversal.

10. The wind power generating system of claim 9, wherein said first bypass switch and said second bypass switch are of the same structure, and said first bypass switch comprises a mechanical switch (4), and an anti-parallel thyristor pair (5a, 5b) serially connected with said mechanical switch.

11. The wind power generating system of claim 10, wherein said anti-parallel thyristor pair is formed by multiple thyristors connected in anti-parallel.

12. The wind power generating system claim 8, wherein said first line commutated converter (3a) and said second line commutated converter (3b) are of the same structure; said first line commutated converter (3a) comprises one or more six-pulse line commutated converter bridges connected in series, and said six-pulse line commutated converter bridge comprises a three-phase full bridge AC-DC converting circuit based on thyristors.

* * * * *